United States Patent
Chen et al.

(10) Patent No.: US 8,856,268 B2
(45) Date of Patent: Oct. 7, 2014

(54) SHARING OF CONSOLE AND WEB-BASED GAMES AND GAMING PROFILES

(75) Inventors: Jiunwei Chen, Snohomish, WA (US); Rocco Crea, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1452 days.

(21) Appl. No.: 12/107,417

(22) Filed: Apr. 22, 2008

(65) Prior Publication Data

US 2009/0264202 A1    Oct. 22, 2009

(51) Int. Cl.
*G06F 15/16* (2006.01)
*A63F 13/30* (2014.01)

(52) U.S. Cl.
CPC ......... *A63F 13/12* (2013.01); *A63F 2300/5546* (2013.01); *A63F 2300/57* (2013.01); *A63F 2300/407* (2013.01)
USPC ............................................. 709/217; 463/42

(58) Field of Classification Search
CPC ............... A63F 13/12; A63F 2300/40; A63F 2300/402; A63F 2300/57
USPC ....................... 709/217, 249; 719/328; 463/42
See application file for complete search history.

(56) References Cited

U.S. PATENT DOCUMENTS

| | | | |
|---|---|---|---|
| 6,044,408 A * | 3/2000 | Engstrom et al. ............. | 719/328 |
| 6,645,068 B1 | 11/2003 | Petermeier et al. | |
| 7,029,394 B2 | 4/2006 | Leen et al. | |
| 8,079,911 B2 * | 12/2011 | Fowler et al. ................... | 463/43 |
| 8,585,507 B2 * | 11/2013 | Jennings et al. ................ | 463/42 |
| 8,602,897 B2 * | 12/2013 | Jennings et al. ................ | 463/42 |
| 2001/0044339 A1 * | 11/2001 | Cordero et al. ................. | 463/42 |
| 2002/0142815 A1 | 10/2002 | Candelore | |
| 2002/0151359 A1 | 10/2002 | Rowe | |
| 2004/0097287 A1 * | 5/2004 | Postrel ............................ | 463/41 |
| 2005/0170889 A1 | 8/2005 | Lum et al. | |
| 2006/0063590 A1 * | 3/2006 | Abassi et al. ................... | 463/29 |

(Continued)

FOREIGN PATENT DOCUMENTS

KR    1020080002432 A    1/2008

OTHER PUBLICATIONS

Written Opinion and International Search Report dated Jan. 8, 2010, International Application No. PCT/US2009/037908.
Xbox Live on Xbox 360, Xbox Users Group, Jul. 22, 2005, 4 pages http://www.xboxusersgroup.com/general-xbox-articles/xbox-live-on-xbox-360.html.

(Continued)

*Primary Examiner* — Douglas Blair
(74) *Attorney, Agent, or Firm* — Micah Goldsmith; Leonard Smith; Micky Minhas (57) ABSTRACT

A method and system are disclosed for allowing the sharing of games and gaming profiles between console and web-based gaming platforms. The present system includes a console service through which console games may be played, and a gaming website through which web-based games may be played. Players may play games through either the console service or gaming website using a single set of identity and profile data that is stored in a central data repository. Using a single repository for profile and other data, players may log in, play games, access their profiles and friends lists, and accrue rewards and game credits, regardless of whether they are using a console or web-based game. In a further aspect of the present system, users of consoles may play the same game and same game sessions with web-based users.

13 Claims, 4 Drawing Sheets

(56) References Cited

U.S. PATENT DOCUMENTS

| | | |
|---|---|---|
| 2006/0121991 A1 | 6/2006 | Borinik et al. |
| 2006/0252545 A1 | 11/2006 | Haque et al. |
| 2007/0013515 A1 | 1/2007 | Johnson et al. |
| 2007/0077994 A1 | 4/2007 | Betteridge |
| 2007/0078002 A1 | 4/2007 | Evans et al. |
| 2007/0117630 A1* | 5/2007 | Fowler et al. .................. 463/42 |
| 2007/0173326 A1 | 7/2007 | Jennings et al. |
| 2014/0057710 A1* | 2/2014 | Jennings et al. ............... 463/29 |
| 2014/0100043 A1* | 4/2014 | Jennings et al. ............... 463/43 |
| 2014/0135129 A1* | 5/2014 | Hussman et al. .............. 463/31 |

OTHER PUBLICATIONS

Create Your Gamer Profile, Xbox, Microsoft Corporation http://www.xbox.com/en-AU/support/xbox360/live/join/create-profile.htm.

Microsoft Unites Xbox and PC Gamers With Debut of Games for Windows-LIVE, Mar. 14, 2007 http://www.microsoft.com/presspass/press/2007/mar07/03-14G4WandXboxLIVEPR.mspx.

Bill Gates Declares 10 Million-Unit Head Start for Xbox 360 and Outlines Future of Interactive Entertainment, Microsoft Corporation, May 9, 2006 http://www.microsoft.com/presspass/press/2006/may06/05-09E32006BriefingPR.mspx.

* cited by examiner

SHARING OF CONSOLE AND WEB-BASED GAMES AND GAMING PROFILES

BACKGROUND

Gaming systems have evolved from those which provided an isolated gaming experience to networked systems providing a rich, interactive experience which may be shared in real time between friends and other gamers. Gaming platforms may in general be broken down into two categories. The first makes use of a dedicated console capable of communication with a particular console service provider. An example of this is Microsoft's Xbox® video game console which communicates with the Live® online game service. The second category of gaming platform is web-based, where games stored and maintained on a host website may be accessed by a generic computing device such as a PC. An example of this category of gaming platform is MSN® Games.

Traditionally, an important distinction between console games and web-based games was that console games and associated data were stored on a local storage device associated with the console. However, with the development of console services such as Live® online game service, much of the storage and processing of game data has shifted upward away from the console, and the distinctions between console games and web-based games are diminishing.

With the blurring of the distinctions between console and web-based games, a significant obstacle still remains preventing cross-over between these two platforms. Namely, each platform still maintains its own set of profiles, including user identification, friends lists, game rewards and other metadata associated with games played on the two platforms. A console gamer has a gamer profile that is stored locally and/or at the console service. The gamer may have spent significant time building that profile. However, when that same user plays a web-based game, he is not able to access or add to his developed profile. The user cannot access his identity or friends lists, and the game rewards earned while playing the web-based game will not be credited to his console game profile. The user must start a new profile for his web-based gaming. The same is true in reverse for web-based gamer profiles. At present, there is no developed scheme for sharing profiles and/or other metadata between console games and web-based games. This presents a significant obstacle to integration of the two platforms. A user is more likely to stick with the platform on which he has a developed profile, and is unlikely to use the other platform if to do so requires development of a second, distinct profile.

This is also true of the games themselves, in that games are developed for console play or web-based play, but not one game for both. Even where two games are essentially the same, a user playing a first version of the game on a console is not able to play or share experiences with a user playing a second, web-based version of the game. And a user playing both versions is not able to combine game rewards accrued on the two different platforms.

SUMMARY

Embodiments of the present system, roughly described, relate to methods of allowing the sharing of games and gaming profiles between console and web-based gaming platforms. The present system includes a console service through which console games may be played, and a gaming website through which web-based games may be played. Players may play games through either the console service or gaming website using a single set of identity and profile data. In order to accomplish this, the present system uses a central repository of data, for example in the console service, which is used for games played both through the console service and the gaming website. Using a single repository for profile and other data, players may log in, play games, access their profiles and friends lists, and accrue rewards and game credits, regardless of whether they are using a console or web-based game.

In a further aspect of the present system, users of consoles may play the same game and same game sessions with web-based users. The crossover may be seamless so that users cannot tell whether other players are playing a web-based or console version of the game. In order to make this possible, games may be written for interacting with a single set of APIs, which may be resident in both the console service and gaming website. Alternatively or additionally, games may be tailored to one of the console service or gaming website as is traditional, and a second layer of handshaking APIs may be added to both the console service and gaming website. These handshaking APIs allow a game tailored for the console service APIs to be understood and played over the gaming website, and visa-versa.

DETAILED DESCRIPTION

Figure 1:
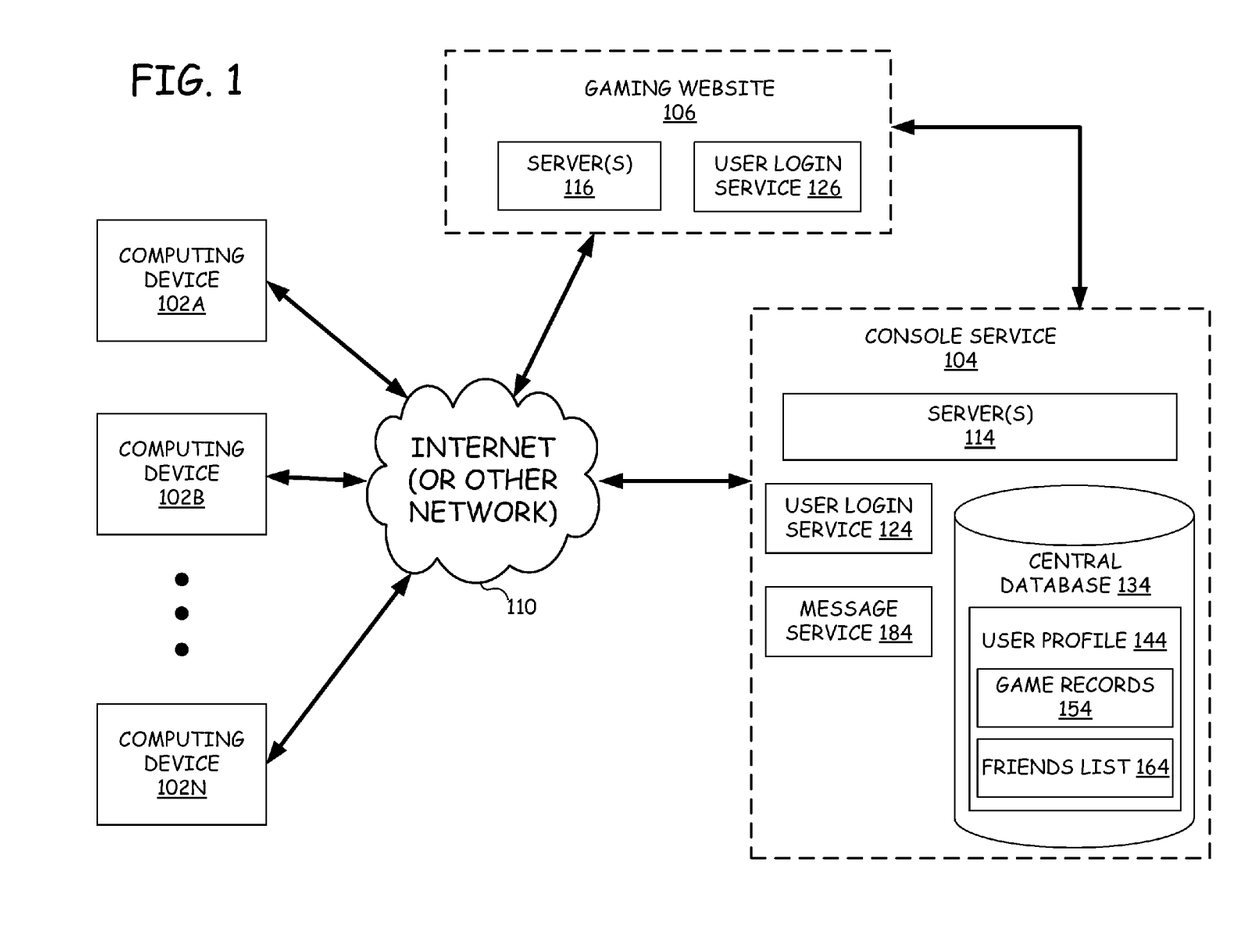
FIG. 1 is a block diagram of an exemplary operating environment for rendering achievement information.

Embodiments of the present system will now be described with reference to FIGS. 1-4, which in general relate to a system allowing sharing of games and gaming profiles between console and web-based gaming platforms. FIG. 1 is a block diagram of an overall system 100 in which games and gaming profiles may be shared between console and web-based gaming platforms. Multiple computing devices 102 (102A, 102B, ... 102N) are capable of communication with each other, a console service 104 and/or a gaming website 106. The computing devices 102 may be a variety of different computing devices, including for example a dedicated console or a generic personal computer, examples of which are explained hereinafter with respect to FIGS. 2 and 3, respectively. The computing devices 102 may be other than a console or PC, and the different computing devices 102 may be of the same type or different than each other in embodiments.

The multiple computing devices 102 may be networked with console service 104 and gaming website 106 through a network 110. In one embodiment, network 110 comprises the Internet, though other networks such as LAN or WAN are contemplated. Network 110 may be a peer-to-peer network or client/server network, or a combination of the two. As explained in greater detail hereinafter, console service 104 may be a service provider dedicated to operation with certain types of computing devices 102, namely, those which are dedicated consoles. In one embodiment, such dedicated consoles may be Microsoft's Xbox® video game consoles, and the console service 104 may be Live® online game service providing service to the Xbox® video game consoles and other dedicated consoles. It is understood that the console service 104 may be other than Live® online game service in alternative embodiments of the present system.

The gaming website 106 may be a website partnering or affiliated with console service 104 so that the website 106 and service 104 cooperate with each other to provide shared games and gaming profiles to users of computing devices 102. In one embodiment, gaming website 106 may be MSN® Games. It is understood that the gaming website 106 may be other than MSN® Games in alternative embodiments of the present system.

Figure 2:
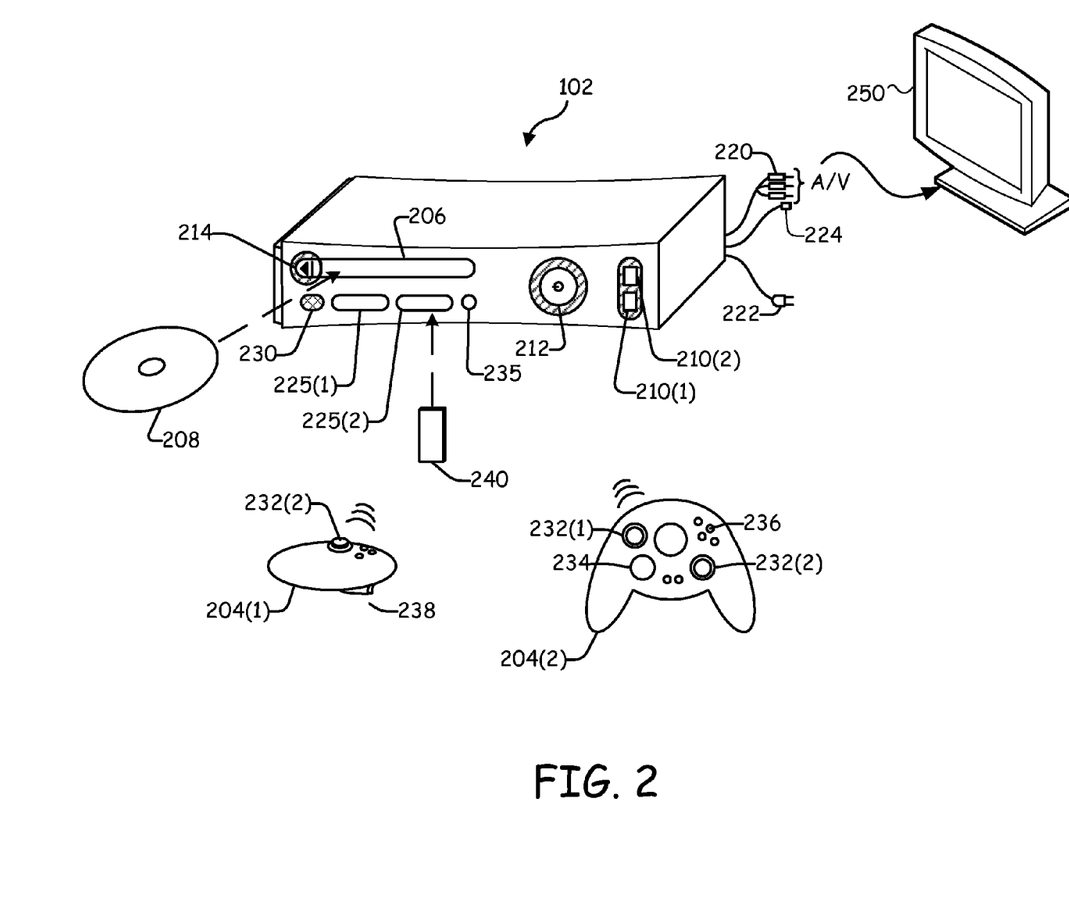
FIG. 2 is an isometric view of an exemplary gaming and media system for carrying out the present system.

FIG. 2 shows an example of a computing device 102 configured as a dedicated game and media console (referred to as console 102 with respect to FIG. 2). In general, console 102 is configured to accommodate one or more wireless controllers, as represented by controllers 204(1) and 204(2). Console 102 is equipped with an internal hard disk drive (not shown) and a portable media drive 206 that support various forms of portable storage media, as represented by optical storage disc 208. Examples of suitable portable storage media include DVD, CD-ROM, game discs, and so forth. Console 102 also includes two memory unit card receptacles 225(1) and 225(2), for receiving removable flash-type memory units 240. A command button 235 on console 102 enables and disables wireless peripheral support.

As depicted in FIG. 2, console 102 also includes an optical port 230 for communicating wirelessly with one or more devices and two USB (Universal Serial Bus) ports 210(1) and 210(2) to support a wired connection for additional controllers, or other peripherals. In some implementations, the number and arrangement of additional ports may be modified. A power button 212 and an eject button 214 are also positioned on the front face of game console 102. Power button 212 is selected to apply power to the game console, and can also provide access to other features and controls, and eject button 214 alternately opens and closes the tray of a portable media drive 206 to enable insertion and extraction of a storage disc 208.

Console 102 connects to a television or other display (such as monitor 250) via A/V interfacing cables 220. In one implementation, console 102 is equipped with a dedicated A/V port (not shown) configured for content-secured digital communication using A/V cables 220 (e.g., A/V cables suitable for coupling to a High Definition Multimedia Interface "HDMI" port on a high definition monitor 250 or other display device). A power cable 222 provides power to the game console. Console 102 may be further configured with broadband capabilities, as represented by a cable or modem connector 224 to facilitate access to a network, such as the Internet. The broadband capabilities can also be provided wirelessly, through a broadband network such as a wireless fidelity (Wi-Fi) network.

Each controller 204 is coupled to console 102 via a wired or wireless interface. In the illustrated implementation, the controllers 204 are USB-compatible and are coupled to console 102 via a wireless or USB port 210. Console 102 may be equipped with any of a wide variety of user interaction mechanisms. In an example illustrated in FIG. 2, each controller 204 is equipped with two thumbsticks 232(1) and 232(2), a D-pad 234, buttons 236, and two triggers 238. These controllers are merely representative, and other known gaming controllers may be substituted for, or added to, those shown in FIG. 2.

In one implementation, a memory unit (MU) 240 may also be inserted into controller 204 to provide additional and portable storage. Portable MUs enable users to store game parameters for use when playing on other consoles. In this implementation, each controller 204 is configured to accommodate two MUs 240, although more or less than two MUs may also be employed.

Console 102 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 208), from an online source, or from MU 240. Samples of the types of media that console 102 is capable of playing include:

Game titles played from CD and DVD discs, from the hard disk drive, or from an online source.

Digital music played from a CD in portable media drive 206, from a file on the hard disk drive (e.g., music in the Windows Media Audio (WMA) format), or from online streaming sources.

Digital audio/video played from a DVD disc in portable media drive 206, from a file on the hard disk drive (e.g., Active Streaming Format), or from online streaming sources.

During operation, console 102 is configured to receive input from controller 204 and display information on display 250. For example, console 102 can display a user interface on display 250 to allow a user to select a game using controller 204 and display achievement information as discussed below.

Figure 3:
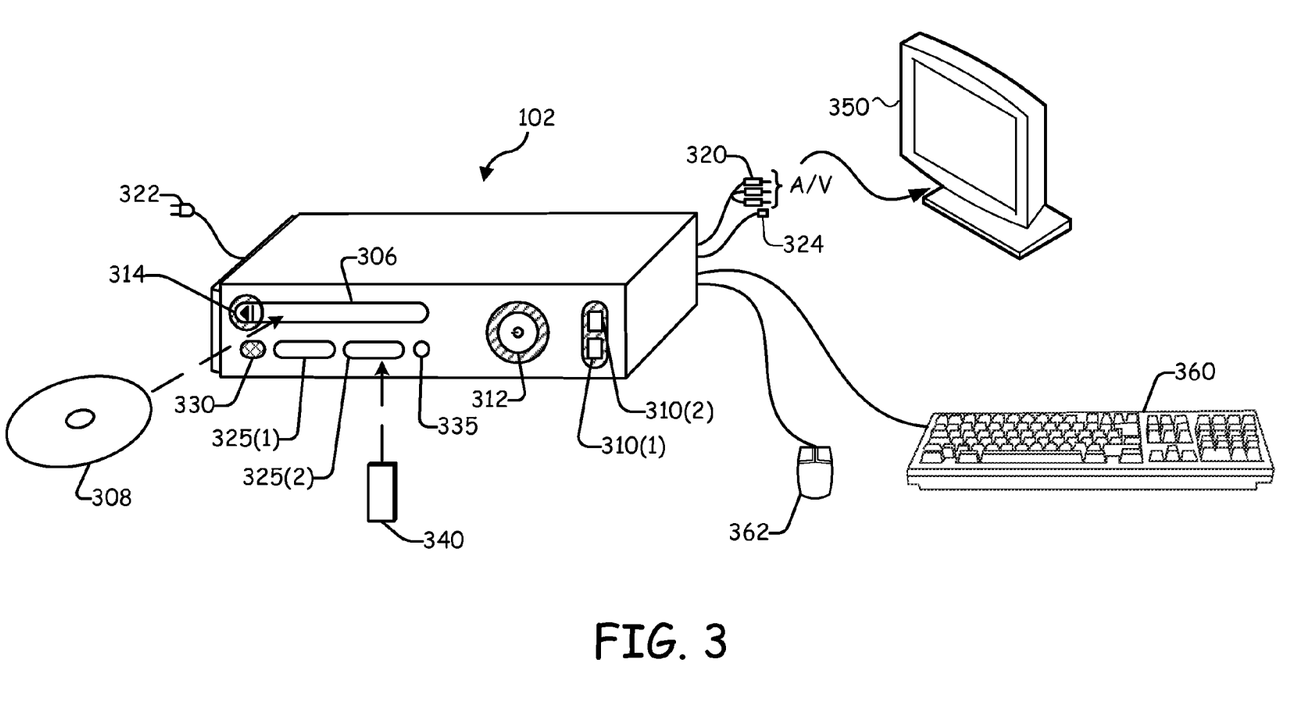
FIG. 3 is an isometric view of an exemplary personal computer for carrying out the present system.

FIG. 3 shows an example of a computing device 102 configured as a standard PC (referred to as PC 102 with respect to FIG. 3). The PC 102 of FIG. 3 may be substantially similar to, and may include many of the same operating components as, console 102 of FIG. 2. Components in FIG. 3 which are structurally and operationally the same as components in FIG. 2 are designated using the same reference numbers as in FIG. 2 but incremented in each case by 100. The previous description of these components is incorporated here. One difference between the console of FIG. 2 and the PC of FIG. 3 is that the controllers 204(1) and 204(2) in FIG. 2 are replaced by a standard keyboard 360 and standard pointing device 362 such as a mouse in FIG. 3.

Figure 4:
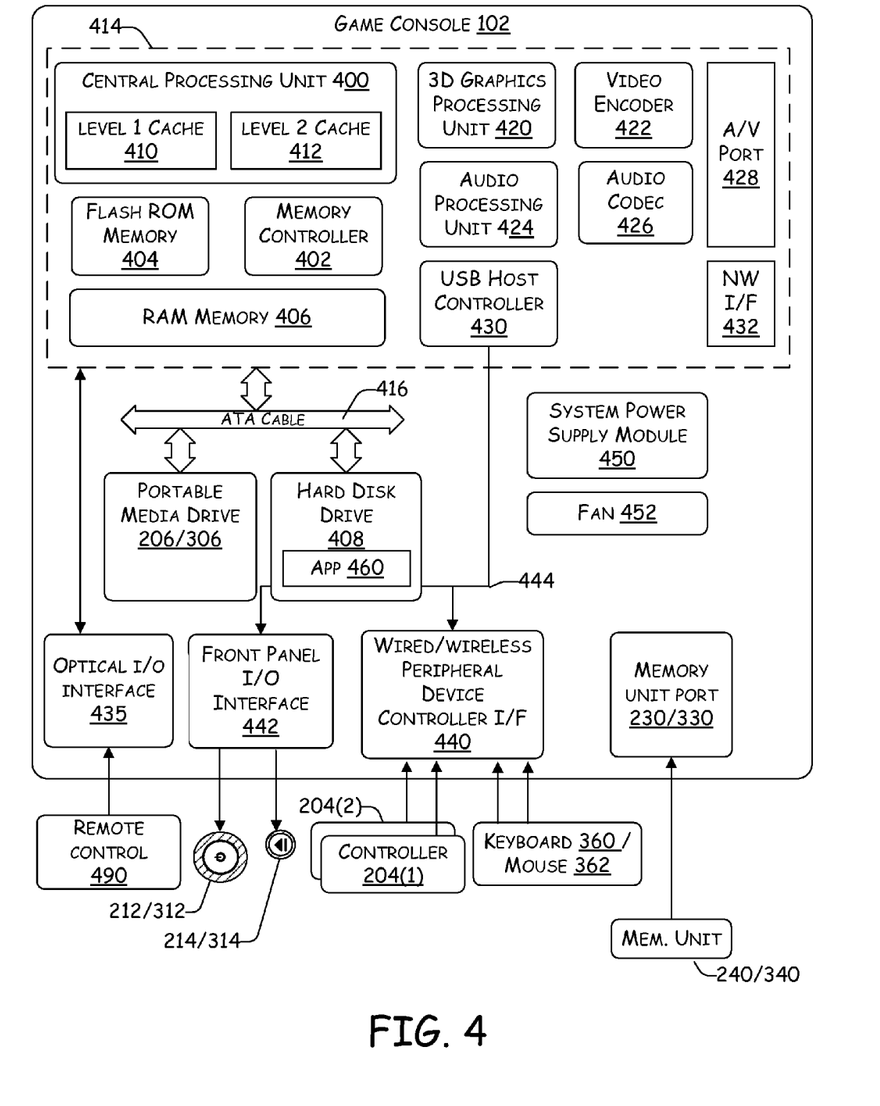
FIG. 4 is an exemplary functional block diagram of components of the gaming and media system shown in FIG. 1.

FIG. 4 is a functional block diagram of a computing device 102 showing the functional components in more detail. Except where noted, the following description applies to both the console of FIG. 2 and the PC of FIG. 3. Computing device 102 has a central processing unit (CPU) 400, and a memory controller 402 that facilitates processor access to various types of memory, including a flash Read Only Memory (ROM) 404, a Random Access Memory (RAM) 406, a hard disk drive 408, and portable media drive 206/306. In one implementation, CPU 400 includes a level 1 cache 410 and a level 2 cache 412, to temporarily store data and hence reduce the number of memory access cycles made to the hard disk drive 408, thereby improving processing speed and throughput.

CPU 400, memory controller 402, and various memory devices are interconnected via one or more buses (not shown). The buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 400, memory controller 402, ROM 404, and RAM 406 are integrated onto a common module 414. In this implementation, ROM 404 is configured as a flash ROM that is connected to memory controller 402 via a PCI bus and a ROM bus (neither of which are shown). RAM 406 is configured as multiple Double Data Rate Synchronous Dynamic RAM (DDR SDRAM) modules that are independently controlled by memory controller 402 via separate buses (not shown). Hard disk drive 408 and portable media drive 206/306 are shown connected to the memory controller 402 via the PCI bus and an AT Attachment (ATA) bus 416. However, in other implementations, dedicated data bus structures of different types can also be applied in the alternative.

A three-dimensional graphics processing unit 420 and a video encoder 422 form a video processing pipeline for high speed and high resolution (e.g., High Definition) graphics processing. Data are carried from graphics processing unit 420 to video encoder 422 via a digital video bus (not shown). An audio processing unit 424 and an audio codec (coder/decoder) 426 form a corresponding audio processing pipeline for multi-channel audio processing of various digital audio formats. Audio data are carried between audio processing unit 424 and audio codec 426 via a communication link (not shown). The video and audio processing pipelines output data to an A/V (audio/video) port 428 for transmission to a television or other display. In the illustrated implementation, video and audio processing components 420-428 are mounted on module 414.

FIG. 4 shows module 414 including a USB host controller 430 and a network interface 432. USB host controller 430 is shown in communication with CPU 400 and memory controller 402 via a bus (e.g., PCI bus) and serves as host for peripheral devices, such as the controllers 204(1)-204(2) of FIG. 2 and the keyboard 360 and mouse 362 of FIG. 3. Network interface 432 provides access to a network (e.g., network 110, FIG. 1) and may be any of a wide variety of various wired or wireless interface components including an Ethernet card, a modem, a wireless access card, a Bluetooth module, a cable modem, and the like.

In the implementation depicted in FIG. 4, computing device 102 includes a peripheral device controller interface 440 for interfacing with peripheral devices 204(1) and 204(2) of the console of FIG. 2, or the keyboard 360 and mouse 362 of FIG. 3. The peripheral device controller interface 440 includes any hardware and software components needed to support wired and wireless operation with an external control device. A front panel I/O interface 442 supports the multiple functionalities of power button 212/312, eject button 214/314, as well as any LEDs (light emitting diodes) or other indicators exposed on the outer surface of computing device 102. Interfaces 440 and 442 are in communication with module 414 via one or more cable assemblies 444. The illustrated implementation also shows an optical I/O interface 435 that is configured to send and receive signals that can be communicated to module 414.

An MU 240/340 is illustrated as being connectable to MU port 225/325. More MU ports may be provided for accepting additional memory units. In the console 102 of FIG. 2, the controllers 204(1) and/or 204(2) may also include MU ports for receiving memory units. Each MU offers additional storage on which games, game parameters, and other data may be stored. In some implementations, the other data can include any of a digital game component, an executable gaming application, an instruction set for expanding a gaming application, and a media file. When inserted into computing device 102 or a controller, MU 240/340 can be accessed by memory controller 402.

A system power supply module 450 provides power to the components of computing device 102. A fan 452 cools the circuitry within computing device 102.

An application 460 comprising machine instructions is stored on hard disk drive 408. When computing device 102 is powered on, various portions of application 460 are loaded into RAM 406, and/or caches 410 and 412, for execution on CPU 400, wherein application 460 is one such example. Various applications can be stored on hard disk drive 408 for execution on CPU 400. In embodiments where computing device 102 is a dedicated console, application 460 may be a game to be played via the console. In this example, when initiated, application 460 loads game instructions into CPU 400 that configure the CPU 400 to process game control data and render the game display. Where computing device 102 is a PC accessing online games from website 106, the game may not be stored locally on hard disk drive 408, but rather may be stored on website 106 and run via a web browser application on computing device 102.

Referring again to FIG. 1, console service 104 and gaming website 106 may include server(s) 114 and 116, respectively. Server(s) 114 and 116 may each include a communication component capable of receiving information from, and transmitting information to, computing devices 102. As explained below, servers 114 and 116 are also capable of communication with each other. Server(s) 116 in gaming website 106 may include servers for hosting online games. It is understood that, upon connection of a computing device 102 with website 106, a software client may be downloaded from a server 116 to the computing device 102 so that at least a portion of an online game and associated data may be downloaded, stored and run locally on the computing device 102. Server(s) 114 of console service 104 provide a collection of services that applications running on computing devices 102 may invoke and utilize as explained below.

Console service 104 includes a login service 124, and gaming website 106 includes a login service 126. Login services 124, 126 are used to authenticate a user on computing devices 102 upon connection to one of console service 104 or gaming website 106. In accordance with the present system as explained below, both console service 104 and gaming website 106 use a common, central repository for storing authentication information so that a user may login to console service 104 and gaming website 106 using the same login credentials.

For example, when a user connects with website 106 and attempts to access games and/or his profile on gaming website 106, the login service 126 of website 106 prompts the user for a gamer tag (a unique identifier associated with the user) and a password. The login service 126 may also obtain a computing device identifier that uniquely identifies the computing device 102 that the user is using and a network path to the website 106.

Upon receipt of a logon request in login service 126, a server 116 of website 106 contacts console service 104, either through a secure connection over network 110, or via a dedicated connection indicated by arrow 120. Console service 104 includes a central database 134 including user profile records 144. The gamer tag and password received at website 106 in login service 126 are communicated to console service 104 and are then authenticated by comparing them to records in user profile records 144. Assuming proper authentication, the computing device identifier and the network path for the website 106 gaming session are stored in user profile records 144 so that messages and information may be sent to the computing device 102. Upon proper authentication, confirmation is also sent from console service 104 to login service 126 on website 106. Thereafter, the user may play the games hosted by gaming website 106, while having access to user profile data stored in user profile 144 on console service 104.

In the example described above, login to gaming website 106 may also result in the user being logged into console service 104. Thus, while a user is logged into website 106, data, messages and other communications may be sent to the user computing device 102 directly from console service 104. Alternatively, while a user is logged into website 106, data, messages and other communications may be sent from console service 104 to gaming website 106 and then in turn to the user computing device 102. In embodiments, upon login to gaming website 106, user profile records may be accessed from the central database 134 and buffered within a server 116 in gaming website 106 to speed communication between website 106 and computing device 102 relating to user profile data.

Instead of logging into website 106, a user may choose to login to console service 104. In this instance, as is known, the login service 124 of console service 104 prompts the user for a gamer tag and a password. The login service 124 may also obtain a computing device identifier that uniquely identifies the computing device 102 that the user is using and a network path to the console service 104.

Upon receipt of a logon request in login service 126, the service 126 authenticates the gamer tag and password by comparing them to records in user profile records 144. User profile records 144 may be located on the same server as user login service 124 or may be distributed on a different server or a collection of different servers. Assuming proper authentication, the user gains access to his profile stored in profile records 144, and the computing device identifier and the network path for the user's gaming session are stored in user profile records 144 so that messages and information may be sent to the computing device 102.

In the example described above, login to console service 104 may cause the service 104 to contact gaming website 106 and log the user into website 106. Thus, the user may receive data, messages and communications from other users who are logged onto website 106. In an alternative embodiment, login to console service 104 may not log the user into website 106.

User profile records 144 in central database 134 store identification and descriptive information about the user such as for example the user's on-line identity, where a user lives, age, gender, etc. This information is available to a user upon login to either console service 104 or gaming website 106 as described above. User profile records 144 can also include additional information about the user such as game records 154 and friends list 164. Game records 154 include information for a user identified by a gamer tag and can include statistics for a particular game, rewards acquired for a particular game and/or other game specific information as desired.

As discussed in the Background section, one drawback to the current separation between console games and web-based games is that a user's rewards on one platform do not carry over to the other platform. Console games and web-based games currently have different reward systems. For example, in games associated with Live® online game service, a user accrues achievements as he accomplishes objectives within a game, while in games associated with MSN® Games, a user accrues badges as he accomplishes objectives within a game. Currently, there is no provision for a Live® service gamer to use, add to or let others see his achievements in a web-based gaming community, and visa-versa.

In embodiments of the present system, both a user's achievements and badges may be stored within game records 154 of central database 134, which is accessible to a user whether logged into console service 104 or gaming website 106. Thus, a user now has a central rewards repository including both achievements and badges to which the user may add as he plays games using the console service 104 and/or the gaming website 106. Moreover, as the two different platforms merge together, game authors may start to include achievements in web-based games and/or badges in console games. In this case, a user may add to his stored achievements upon playing both console and web-based games. Alternatively or additionally, a user may add to his stored badges upon playing both console and web-based games.

Friends list 164 includes an indication of friends of a user that are also connected to or otherwise have user account records stored within central database 134. While console and web-based games previously had separate friends lists, according to the present system, a user may have a single friends list usable on both platforms. When using gaming website 106, a user may elect to access, add friends to, or delete friends from his friends list 164. This access/change request is communicated to console service 104, at which point access to friends list 164 in central database 134 is provided, and the change, if any, is made and stored. Friends may also be added to/removed from friends list 164 when using console service 104 as is known.

Thus, the present system brings together console and web-based gaming communities. Friends list 164 can be used to create a sense of community of users of both console service 104 and gaming website 106. Users can select other gamers to be added to their friends list 164 and view information about another gamer's friends such as game performance, current online status, friends list, etc.

User profile records 144 also include additional information about users which may be shared to both console service 104 and gaming website 106. This additional information may include games that have been downloaded by a user and licensing packages that have been issued for those downloaded games, including the permissions associated with each licensing package. Portions of a user's profile may be maintained locally on a computing device 102 (whether a console, PC or other computing device). In such instance, the locally stored profile may be synchronized periodically with the user profile records 144 in database 134 so that users of both console service 104 and gaming website 106 have up to date information on other users in the community.

Server(s) 114 in console service 104 also include message service 184 which permits one computing device 102, such as a console, to send a message to another computing device 102, such as a PC. According to the present system, messages may be sent from, and received by, any computing device, regardless of whether the computing device is connected to console service 104 or gaming website 106. Messages can include text messages, voice messages, and specialized invite text messages. In particular, as explained hereinafter, the console service 104 and/or gaming website 106 may include handshaking application programming interfaces (APIs) that allow users to play the same game through either the console service 104, gaming website 106 or both. As such, a user on gaming website 106 may use message service 184 to send a specialized invite text message to a user on console service 104, or visa-versa. Invite text messages allow a user playing the game on one computing device to invite one or more users on another computing device to play in the same game while using network 110 to pass gaming data between the two computing devices so that the two users are playing from the same session of the game. Friends list 164 can also be used in conjunction with message service 184.

In the embodiments described above, the central repository for profile and other data has been described as being resident within the console service 104. It is understood that in further embodiments, the central repository for profile and other data, used by both the console service and gaming website, could be stored within a server 116 on gaming website 106. In a further embodiment, the central repository of for profile and other data may be stored in a database that is separate but accessible to both console service 104 and gaming website 106.

At present, a user playing a game via a console cannot join a user playing a web-based game. Even if the game play for a console game and web-based game are substantially the same, there is currently significant differences in the coding of the games, and the APIs used by the games, that prevent crossover between the console and web-based games.

Traditionally, a service provider such as Live® online game service distributes a game development kit (GDK) so that game authors can write games that are tailored to work with the Live® online game service APIs. Similarly, gaming websites such as MSN Games distribute a GDK so that game authors can write games that are tailored to the MSN Games APIs. In an aspect of the present system, a unified set of APIs may be developed for use by both console service 104 and gaming website 106. Thus, the console service 104 and gaming website 106 may maintain their traditional APIs (and game writers may tailor their game to operate with one or the other set of APIs). However, in this embodiment, another layer of handshaking APIs are added to both the console service 104 and gaming website 106. These handshaking APIs allow a game tailored for the console service 104 APIs to be understood and played over the gaming website 106, and visa-versa.

Having a unified set of APIs can dramatically decrease the time to market for a game. This benefits both the game developer and the platform holder. For a game developer, they do not have to re-learn a new set of APIs when porting a game from console to web and vice versa. The developer can focus more on the game code itself. For the platform holder (web and console), they can expect to get better developed games from the developers they work with, in shorter time.

By having a game be available on both web and console platforms, this will also lead to increased sales, and makes it easier to leverage games written for one platform or the other. For example, a platform holder may have a popular game for one particular platform, but no easy way to port it to another. With the shared APIs and user base of the present system, it makes it a much easier decision to make their games multi-platform across the console and web. Moreover, by making a game cross-platform across console and web, it will increase the user-base, and that in turn will also increase how long such a game remains popular. Further still, a game that may have been out for a long time for one platform can be re-launched on the other, and it can help spur additional growth/attention of both the game and the platform they are on.

The present system also opens up portfolio viability for platform holders in that the present system allows many more games to be made available across the respective platforms. This increases the number of popular games that can be added to the platform's portfolio of titles. For example, a console platform holder can now look at a popular web game and it makes it much easier to request the game developer to make a console version of it, and vice versa. A lot of the roadblocks that might have prevented this in the past (re-learning APIs, low user base, etc.) are removed by the present system been removed.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. In a system including a console for running a gaming application, the console having a connection to a console service, and the console having a browser application for accessing a gaming application on a gaming website, a computer implemented method of allowing sharing of game data between the console service and the gaming website, comprising the steps of:
   (a) storing data in a data repository, the data including authentication data, a friends list and accumulated gaming rewards;
   (b) sharing the data in the data repository with a server of the console service;
   (c) sharing the data in the data repository with a server of the gaming, the server of the gaming website being different than the server for the console service; and
   (d) sending a message from a first user on the console gaming platform to a second user on the gaming website, the message comprising an invite to the second user on the gaming website to join the same game session as the first user on the console gaming platform.

2. The computer implemented method of claim 1, wherein said step (a) of storing data in a data repository comprises the step of storing data in a data repository resident in the console service.

3. The computer implemented method of claim 1, wherein said step (a) of storing data in a data repository comprises the step of storing both achievement data for console games and badge data for web-based games.

4. The computer implemented method of claim 3, wherein a user can add to one or both of the user's achievement data and badge data while playing through either of the console service or gaming website.

5. The computer implemented method of claim 3, further comprising the steps of allowing other gamers on the console service to view a user's badge data for web-based games, and allowing other gamers on the gaming website to view a user's achievement data for console games.

6. The computer implemented method of claim 1, further comprising the step (e) of automatically logging a user into the console service upon the user logging into the gaming website.

7. The computer implemented method of claim 1, further comprising the step (f) of automatically logging a user into the gaming website upon the user logging into the console service.

8. A computer implemented method of allowing sharing of game data between console and web-based gaming platforms, comprising the steps of:
   (a) storing profile data in a data repository of a console service for the console gaming platform;
   (b) allowing access to the profile data in the data repository by a console service server of the console service for the console gaming platform;
   (c) receiving a user request to logon to the console service;
   (d) granting the logon request upon authenticating the user;
   (e) automatically logging the user into a gaming website for the web-based gaming platform upon authenticating the user;

(f) accessing the profile data in the data repository of the console service by a gaming website server of the gaming website for the web-based gaming platform, the console service server being different than the gaming website server, and the console service being separate from the gaming website; and (g) allowing a single game session to be shared by users of the console gaming platform and the web-based gaming platform.

9. The computer implemented method of claim 8, wherein said step (g) of allowing a single game session to be shared by users of the console gaming platform and the web-based gaming platform comprises the steps of including application programming interfaces on the console service allowing a user of the console service to play a game written for the web-based gaming platform.

10. The computer implemented method of claim 8, wherein said step (g) of allowing a single game session to be shared by users of the console gaming platform and the web-based gaming platform comprises the steps of including an application programming interface on the gaming website allowing a user of the gaming website to play a game written for the console gaming platform.

11. The computer implemented method of claim 8, wherein said step (g) of allowing a single game session to be shared by users of the console gaming platform and the web-based gaming platform comprises the step of including a handshaking application programming interface on the gaming website allowing a game tailored for the console service to be understood and played over the gaming website.

12. The computer implemented method of claim 8, wherein said step (g) of allowing a single game session to be shared by users of the console gaming platform and the web-based gaming platform comprises the step of including a handshaking application programming interface on the console service allowing a game tailored for the gaming website to be understood and played over the console service.

13. The computer implemented method of claim 8, wherein said steps (b) and (f) of allowing access to the profile data in the data repository by the servers of the console service and gaming website comprise the step of allowing access by the servers of the console service and gaming website to a shared set of authentication data, a friends list and accumulated gaming rewards used by both the console and web-based gaming platforms.

* * * * *